Figure 1:
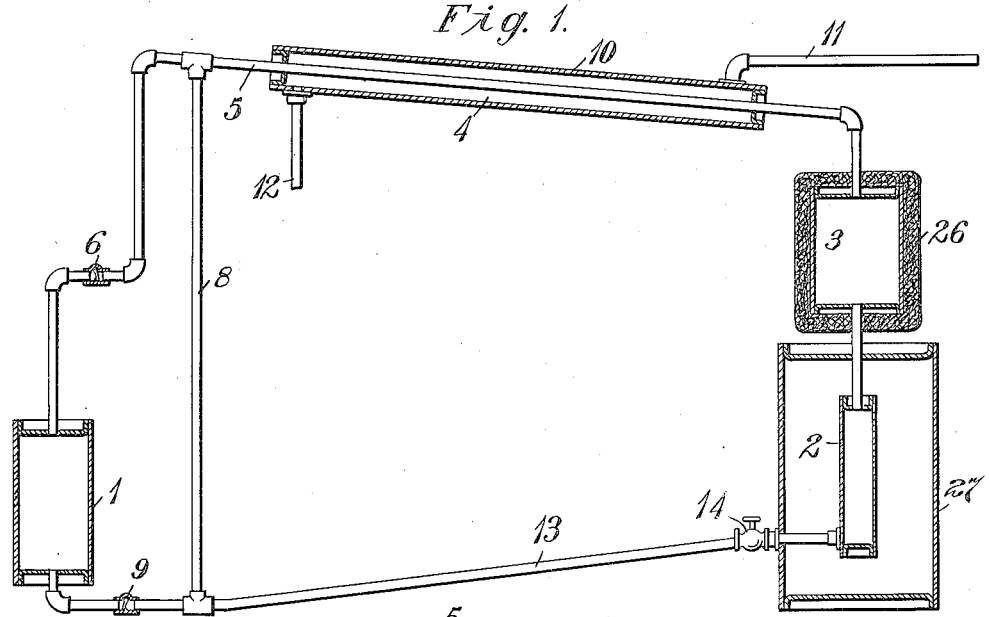

W. COOPER.
REFRIGERATING APPARATUS.
APPLICATION FILED DEC. 6, 1907.

950,463.

Patented Feb. 22, 1910.

WITNESSES:
Fred H. Miller
Birney Hines

INVENTOR.
William Cooper
BY
R. J. Barbour
ATTORNEY

UNITED STATES PATENT OFFICE.

WILLIAM COOPER, OF PITTSBURG, PENNSYLVANIA.

REFRIGERATING APPARATUS.

950,463.  Specification of Letters Patent.  Patented Feb. 22, 1910.

Application filed December 6, 1907. Serial No. 405,385.

*To all whom it may concern:*

Be it known that I, WILLIAM COOPER, a citizen of the United States, and a resident of Pittsburg, in the county of Allegheny and State of Pennsylvania, have invented a new and useful Improvement in Refrigerating Apparatus, of which the following is a specification.

My invention relates to the manufacture of ice and to artificial refrigeration, and it has special reference to such refrigerating apparatus as involves the absorption and evaporation of gases and liquids.

The object of my invention is to provide an apparatus of the class above indicated that shall be simple and inexpensive in construction and effective, reliable and practically automatic in operation.

Apparatus which has heretofore been utilized for the artificial production of ice and refrigeration may be divided, in general, into two classes commonly known as compression and absorption machines. The compression machines of the prior art are entirely different in principle from the apparatus of my present invention and need not be further considered. The absorption machines of the prior art have, in general, employed pumps or other mechanisms for providing a forced circulation of the fluids used as heat vehicles. According to my present invention, no such mechanisms are employed. the circulation being produced by the inherent characteristics of the liquids used and the action of gravity upon them.

As hereinafter set forth in detail, I provide a refrigerating apparatus in which two liquids, that boil at materially different temperatures, are used, the boiling point of one being sufficiently low to produce the desired refrigeration within the range of working pressures. It is also essential that the liquid having the higher boiling point shall be capable of absorbing the vapor of the other liquid; in other words, the vapor or gas produced by the boiling of the liquid having the lower boiling point must be readily soluble in the other liquid. The amount of gas or vapor which may be absorbed by the liquid is dependent upon the temperature of the liquid and the pressure exerted upon it, the higher the temperature at any pressure and the lower the pressure at any temperature, the less the absorption. Consequently, if the liquid has absorbed a maximum amount of gas at a given temperature and pressure, an increase in temperature will expel a portion of the gas or vapor absorbed. The gas or vapor thus driven off may be liquefied by reducing the temperature of the gas or vapor below its liquid boiling point at the existing pressure.

In my improved refrigerating apparatus, I prefer to employ water for the liquid having the higher boiling point and ammonia for the liquid having the lower boiling point, although my invention is not restricted in this regard, and any suitable fluids having the necessary properties may be employed. Ammonia is specially well adapted for this use, since it is highly soluble in water at ordinary temperatures and pressures and since it is easily liquefied within the range of moderate working pressures and temperatures.

In general, my refrigerating apparatus comprises a still or boiler in which a solution of ammonia is contained and from which ammonia gas is driven off by intermittent applications of external heat, a subcondenser or dehydrator, a condenser in which the ammonia gas is condensed into anhydrous liquid ammonia, a storage reservoir which receives the liquid ammonia from the condenser and is completely insulated from external heat transfer, an evaporator which is supplied with liquid ammonia from the storage reservoir and is completely filled with the liquid ammonia at all times, and a tank or receptacle containing a bath of congealable liquid in which the evaporator is immersed, said tank or receptacle being disposed in the space or chamber to be refrigerated. The condenser is located at a higher level than that of the reservoir, and the evaporator is located below the reservoir so that the liquid ammonia condensed may be carried to the reservoir and from thence supplied to the evaporator by the action of gravity upon it without the use of expansion valves or other mechanism.

The storage reservoir is of sufficient size to receive all of the liquid ammonia condensed during the distillation process. The storage reservoir just referred to is of great importance to my invention, and greatly improved results may be obtained by its use. As indicated above, the evaporator is full of liquid ammonia, even when the boiler or still is filled with an ammonia solution of maximum strength.

My invention is illustrated in the accompanying drawings, in which—

Figure 2:
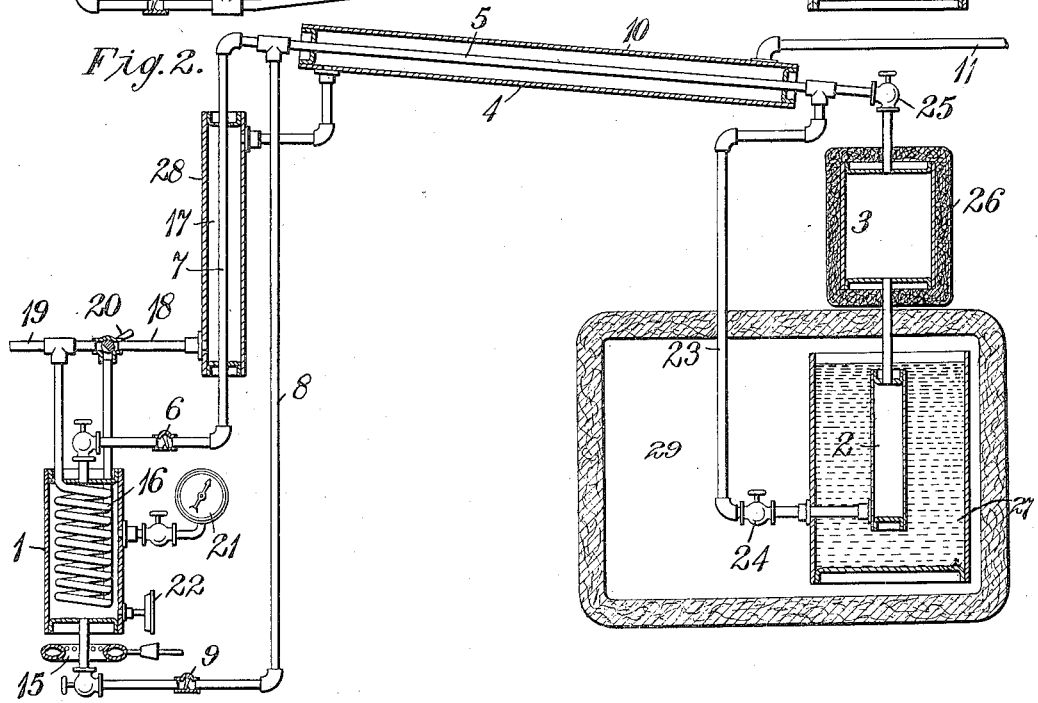

Figure 1 is a diagrammatic view of a system and apparatus arranged in accordance therewith, and Fig. 2 is a view similar to that of Fig. 1, in which a modified arrangement is disclosed.

Referring to the drawings, with special reference to Fig. 1, the system here illustrated comprises a receptacle or boiler 1 commonly known as a still to which heat may be applied, a second receptacle 2, commonly known as an evaporator, which communicates with the first, as hereinafter explained, a storage reservoir 3, which communicates with the receptacle 2, and a condenser 4, which, as shown, is interposed between the receptacle or boiler 1 and the storage tank 3, communication being established between these two members by a pipe 5. The storage reservoir 3 does not necessarily communicate directly with the condenser, but it must communicate with the evaporator, since it is intended to keep the evaporator full of anhydrous liquid refrigerant at all times. A check valve is located in the pipe 5, near the receptacle 1, so that fluid may escape from the receptacle into the pipe but may not return by the same passage-way. As the pipe 5 extends through the condenser it is slightly inclined, so that it drains into the storage reservoir 3 and the evaporator 2. From some point in the pipe 5, between the boiler and the condenser, a return connecting-pipe 8 is provided, which is connected to the bottom of the receptacle or boiler 1. A check valve 9 may preferably be located in this return pipe, in order to prevent fluid from passing out of the boiler or receptacle 1 in this direction, although this valve is not essential to the operation of the system.

The condenser 4 comprises a jacket 10 which surrounds a material length of the inclined section of the pipe 5 and which is supplied with water or other cooling fluid from any convenient source, through a pipe 11, an escape or outlet port being provided through a pipe 12. Since the condenser forms no part of my present invention, any suitable type, many of which are well known, may be employed in lieu of that illustrated in the drawings.

The lower extremity of the evaporator 2, in the arrangement of Fig. 1, should preferably be somewhat above the liquid level in the receptacle or still 1, and communication may be established from one to the other through a pipe 13, under certain conditions hereinafter explained, the pipe being normally closed by a valve 14. Circulation in the pipe 13 can never take place, except in one direction, by reason of the fact that evaporator 2 is higher than the liquid level in receptacle or still 1.

Special reference may now be had to Fig. 2, in which corresponding parts are designated by the same reference characters. As here illustrated, the boiler or receptacle 1 is provided with a heater 15, which may be supplied with energy from any suitable source, and a cooling coil 16, which is located within the boiler. A vertical pipe section 7 is here surrounded by a jacket 28 which forms a second condenser, through which the cooling fluid exhausted from the first condenser 4 may pass. The cooling device thus formed, which may be designated as a dehydrator or subcondenser 17, is provided with an exhaust pipe 18, which may either communicate directly with a waste pipe 19 or with the cooling coil 16 of the boiler 1, according to the position occupied by a three-way cock 20. The boiler or receptacle 1 is provided with a pressure gage 21 and a pressure-relieving device 22, which is described and claimed in my co-pending application, Serial No. 405,386, filed of even date herewith. Communication is established from the lower extremity of the evaporator 2 to the pipe 5 by a pipe 23, which is joined to the latter at any convenient point, between the storage tank 3 and the condenser 4. Stop cocks 24 and 25 are provided at the outer extremities of both the receptacle 2 and the storage reservoir 3; the pipe 23 of this figure being substituted for the pipe 13 of Fig. 1. The storage reservoir 3 is insulated against external heat absorption, by a coating or jacket 26; and the receptacle 2 is immersed in a bath of brine or other suitable congealable liquid contained in a tank or receptacle 27. The freezing point of this liquid corresponds approximately to the desired temperature of refrigeration, so that, by freezing and thawing the liquid, as hereinafter explained, the temperature of the chamber or refrigerating space 29 may be maintained at a substantially constant value.

The operation of the system is as follows: Assuming that cooling water is flowing through the condenser 4 and the subcondenser or dehydrator 17; that the boiler or still 1 is filled with a strong solution of ammonia at a low temperature; that the evaporator 3 is full of liquid ammonia, and that the insulated reservoir 3 is practically empty; if heat is now applied to the boiler 1, ammonia gas will be driven off from the solution into the condenser 4. It will here be condensed into liquid ammonia and will flow into the storage reservoir 3 toward which the condenser is inclined. When heat is first applied to the generator 1, it is necessary for the storage reservoir 3 to be practically empty, but it is also necessary for the evaporator 2 to be full of liquid ammonia, in order that none of the ammonia gas being distilled from the generator shall enter the evaporator and there condense, since heat would thus be given up and the effects of the previous refrigerating charge would be nullified. The evaporator is immersed in a salt solution which is contained in a tank or receptacle 27 and which freezes substantially at the desired temperature of refrigeration, in order that a certain amount of the refrigeration effected during the evaporation period may be utilized in freezing the brine, the melting of the ice so formed being utilized for maintaining the constant refrigerating temperature during the time when heat is applied to the generator 1. As the application of heat to the generator is continued, the storage reservoir 3 is gradually filled with the liquid ammonia, this process being stopped only when the solution in the generator is weakened to a point after which there is no advantage in applying more heat. As soon as the heat is shut off, the temperature of the liquid in the generator 1 will, of course, decrease, and, in order to aid the cooling of the generator, water may be passed through a cooling coil 16 within it. As the generator 1 is cooled, the gas over the surface of the solution will be absorbed and the pressure within the apparatus reduced. As no gas can enter the top of the generator 1 owing to the check valve 6 in the outlet pipe 7 which connects the top of the generator 1 and the condenser 4, the pressure in the generator will be lowered until the gas is forced in at the bottom through a second pipe 8 between the adjacent end of the condenser 4 and the bottom of the generator 1, having a check valve 9, from which it will bubble up through the weak solution and will be promptly absorbed. The passing of the gas up through the liquid will also insure the prompt absorption of any slight amount of gas which may leak through the check valve 6 in the outlet pipe 7 by reason of the circulation effected. As this action continues, the pressure in the reservoir 3 and in the evaporator 2 is gradually reduced until it reaches the pressure corresponding to the temperature of the refrigerator. Up to this point there is no gas produced in the evaporator, for the reason that the temperature there is low. The storage reservoir 3, which was at the temperature of the condenser when the absorption began, is now lowered in temperature as well as the liquid ammonia it contains, until both are at the temperature of the evaporator 2, after which no action takes place, and no ammonia gas is formed in the reservoir, the action being transferred to the evaporator.

There will be no ammonia gas formed in the reservoir 3, for the reason that it is insulated against the absorption of external heat by the jacket 26, so that it is impossible, according to well known principles, for the liquid ammonia contained in it to boil. By this means, the action is practically confined to the evaporator after the liquid in the reservoir is at the temperature of the liquid in the evaporator. The liquid ammonia in the evaporator 2 continues to boil and take up heat from the refrigerator until the solution in the generator 1 is again saturated to a maximum degree at the pressure of the evaporator and at the temperature of the water in the cooling coil 16 with which the generator is provided. After this point is reached, the cycle is again repeated by applying heat to the generator 1.

During the absorption of the ammonia gas by the solution in the generator, the action is very much more rapid at first when the solution is weak than at the end of this process when the solution is saturated. This condition would tend to make the temperature of the refrigerator vary, if the heat were taken up directly from the refrigerator by the liquid ammonia. However, this variation is avoided by surrounding the evaporator with brine of the proper strength for the temperature required, and freezing a portion of it while the absorption is more rapid, thus producing a supply of refrigeration in the form of ice to be drawn upon during the time that the absorption is less rapid and during the period of distillation.

The function of the subcondenser or dehydrator 17 is to separate any water vapor, which may be carried out of the generator during the distilling process, from the ammonia gas before it reaches the condenser, the water returning through the lower connection used by the gas during the evaporation process. The flow of water through the cooling coil 16 must be so regulated that the solution will be cooled only at a rate corresponding to the absorption of ammonia gas.

In cool weather or under some conditions, it may be desirable to reduce the amount of refrigeration supplied. While this is automatically taken care of by the freezing of the brine, it can be still further controlled by the amount of ammonia distilled out at each cycle or by making the cycles cover a longer period of time. In other words, if a little refrigeration is desired, a little heat should be supplied, the apparatus being found to work as well at one rate as it does at another and being always automatic.

The apparatus described is practically automatic and continuous, the only attention required being to start and stop the heater for the boiler at times which are predetermined and which when once determined are constant for any given device. A substantially constant, uniform temperature is maintained in the refrigerator by reason of freezing the liquid contained in reservoir 27 during the evaporation period, the ice forming a reservoir of stored cold, which maintains the temperature during the distilling period.

It is conceivable that various modifications in the size and proportions of the apparatus illustrated may be effected within the scope of my invention, and I desire that only such limitations be imposed as are indicated in the appended claims.

I claim as my invention:

1. Refrigerating apparatus comprising a still or boiler, an evaporator, a condenser, and a storage reservoir interposed between the condenser and the evaporator and above the evaporator for supplying refrigerating liquid thereto directly by gravity, said reservoir having a coating or jacket of heat-insulating material for confining the evaporating process to the evaporator.

2. Refrigerating apparatus comprising a still or boiler having an outlet at the top and an inlet at the bottom, an evaporator or expansion device, a storage reservoir communicating therewith and arranged to drain thereinto by gravity, a condenser connected to the top of the still or boiler and draining into the storage reservoir, a shunt pipe connection between the condenser inlet and the bottom of the still or boiler, and means for preventing an inward flow at the top of the still or boiler.

3. Refrigerating apparatus comprising a still or boiler, an evaporator or expansion device, a storage reservoir above the evaporator and arranged to drain thereinto by gravity and provided with a jacket of heat insulating material, a condenser between the reservoir and the still or boiler and arranged to drain into the reservoir, pipes joining the condenser to both the bottom and the top of the still or boiler, and means for preventing an inward flow at the top of the still or boiler.

4. In a refrigerating apparatus, the combination with a chamber to be cooled, a receptacle containing congealable liquid, disposed therein, an evaporator immersed in the congealable liquid, and a heat-insulated storage reservoir above the evaporator and communicating therewith, of a condenser draining into the storage reservoir, a still on a lower level than the evaporator pipes connecting both the top and bottom of the still with the receiving end of the condenser, and means for preventing an outward flow at the bottom and an inward flow at the top of the still.

5. Refrigerating apparatus comprising a still or boiler, an evaporator or expansion device, a storage reservoir provided with a heat insulating covering and communicating directly with the evaporator or expansion device and draining thereinto by gravity, and a condenser connected to the outlet of the still or boiler and arranged to drain into the storage reservoir.

6. Refrigerating apparatus comprising a still or boiler, an evaporator or expansion device, a storage reservoir provided with a heat insulating covering and communicating with the evaporator or expansion device and arranged to drain thereinto by gravity, a condenser connected to the outlet of the still or boiler and arranged to drain into the storage reservoir, a valve controlled drain pipe connected to the bottom of the evaporator or expansion device, and a valve at the inlet end of the storage reservoir.

7. Refrigerating apparatus comprising a still or boiler, an evaporator or expansion device, a storage reservoir above said evaporator or expansion device and arranged to drain thereinto by gravity, a condenser connected to the boiler or still and arranged to drain by gravity into the storage reservoir, and piping arranged to conduct the vapor from the evaporator or expansion device through the condenser and to the bottom of the still or boiler.

In testimony whereof, I have hereunto subscribed my name this 4th day of Dec., 1907.

WILLIAM COOPER.

Witnesses:
R. J. DEARBORN,
BIRNEY HINES.